United States Patent [19]

Ramos

[11] Patent Number: 4,932,287
[45] Date of Patent: Jun. 12, 1990

[54] COMBINED SHOE AND PEDAL FOR SPORTS BICYCLE

[76] Inventor: Dennis Ramos, 5108 Parkhurst Dr., Santa Rosa, Calif. 95409

[21] Appl. No.: 268,316

[22] Filed: Nov. 7, 1988

[51] Int. Cl.⁵ ............................................. G05G 1/14
[52] U.S. Cl. .................................. 74/594.6; 74/594.4; 36/131
[58] Field of Search ................ 74/594.4, 594.6, 560; 36/131, 132; D12/125

[56] References Cited

U.S. PATENT DOCUMENTS

| 550,409 | 11/1895 | Hanson .................................. 74/594.6 |
| 575,712 | 1/1897 | Hamilton et al. .................... 74/594.6 |
| 616,167 | 12/1898 | Walker .................................. 74/594.6 |
| 620,266 | 2/1899 | Wodiska ............................... 74/594.6 |
| 4,298,210 | 11/1981 | Lotteau et al. ....................... 74/594.6 |

FOREIGN PATENT DOCUMENTS

| 99601 | 10/1898 | Fed. Rep. of Germany ..... 74/594.6 |
| 105471 | 9/1899 | Fed. Rep. of Germany ..... 74/594.6 |
| 3626909 | 7/1987 | Fed. Rep. of Germany ..... 74/594.6 |
| 888436 | 12/1943 | France .................................. 74/594.6 |
| 986455 | 8/1951 | France .................................. 74/594.6 |
| 993958 | 11/1951 | France .................................. 74/594.6 |
| 485748 | 5/1938 | United Kingdom ............... 74/594.6 |

OTHER PUBLICATIONS

Article entitled 14 Strapless Road Pedals from Jun., 1988 issue of *Cyclist* magazine (pp. 54–56).

Primary Examiner—Vinh T. Luong
Attorney, Agent, or Firm—Lothrop & West

[57] ABSTRACT

A plurality of retaining pins extending laterally outwardly from the side edges of a sole of a bicyclist's shoe engage in conjugate holes formed in inner and outer spring-loaded retaining plates which extend vertically upwardly from a pedal, thereby securing the shoe to the pedal. The inner retaining plate is laterally movable away from the outer retaining plate by shifting the shoe inwardly, thereby enabling the shoe to be engaged and disengaged from the pedal. The outer retaining plate may be depressed by the shoe and automatically latched into a retracted position inside the pedal body so that the shoe may be secured to the pedal by only the inner retaining plate or may be disengaged completely. The outer retaining plate may be unlatched and released to return to upper position concurrently with movement of the inner retaining plate away from the outer retaining plate.

15 Claims, 4 Drawing Sheets

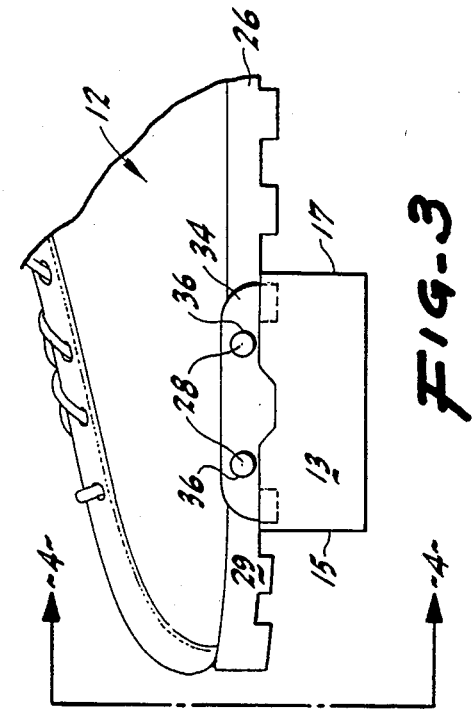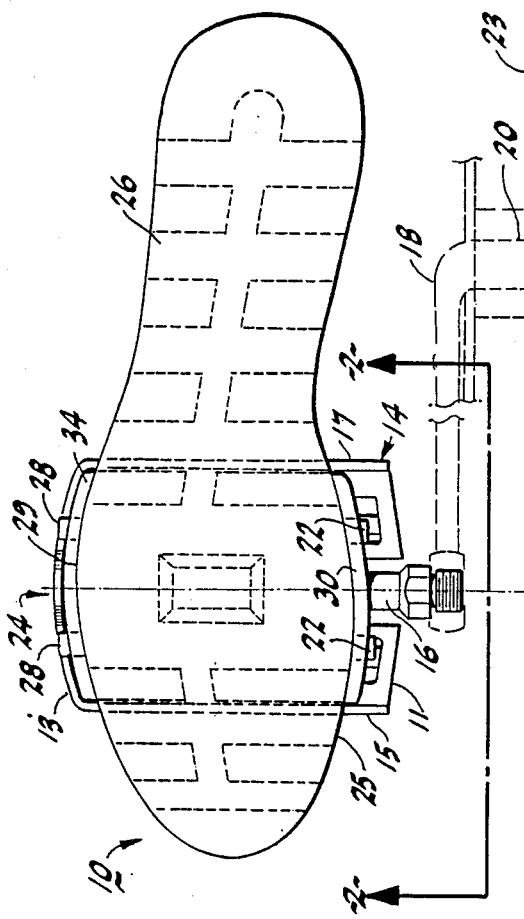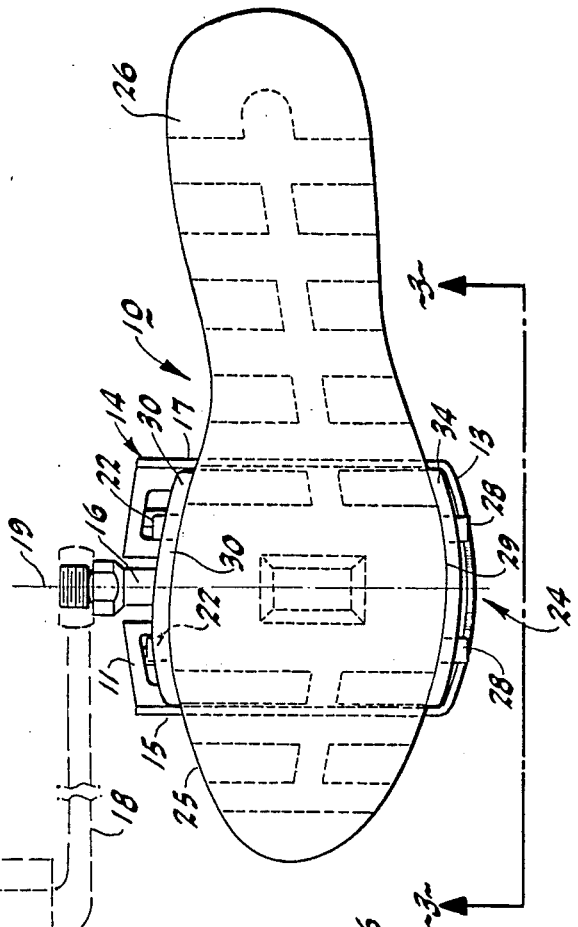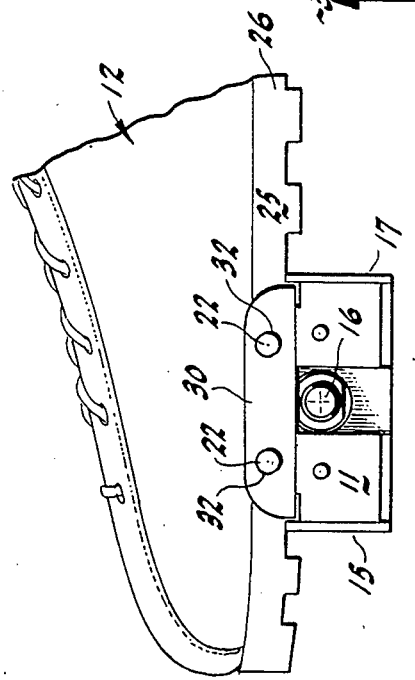

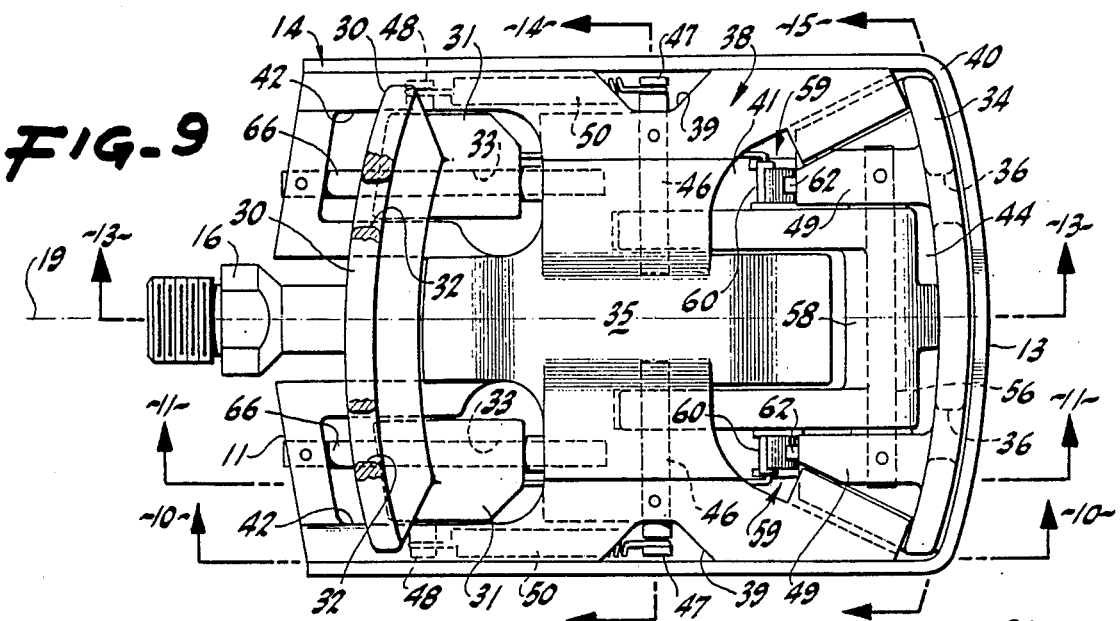
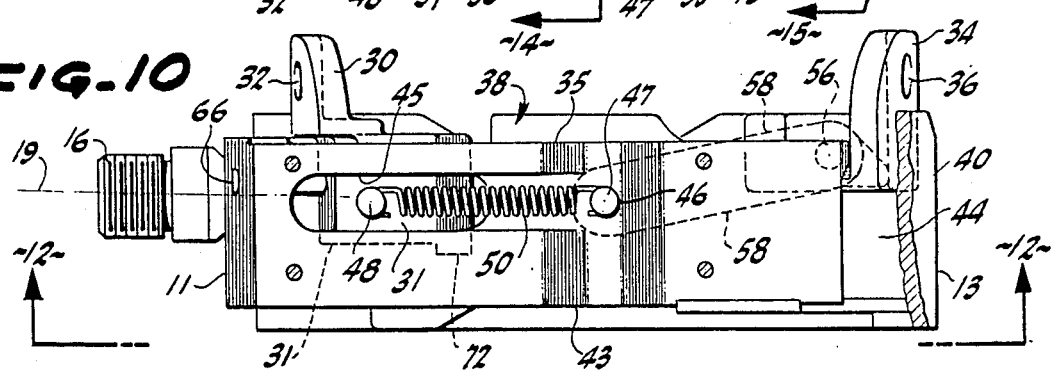
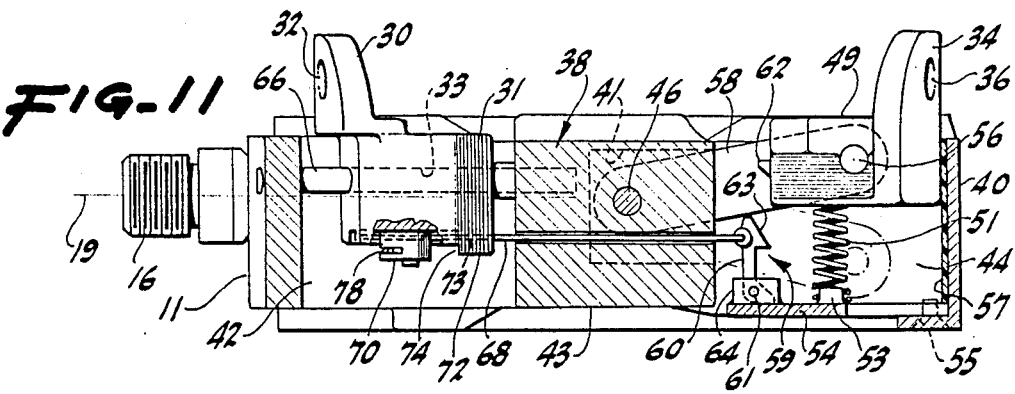
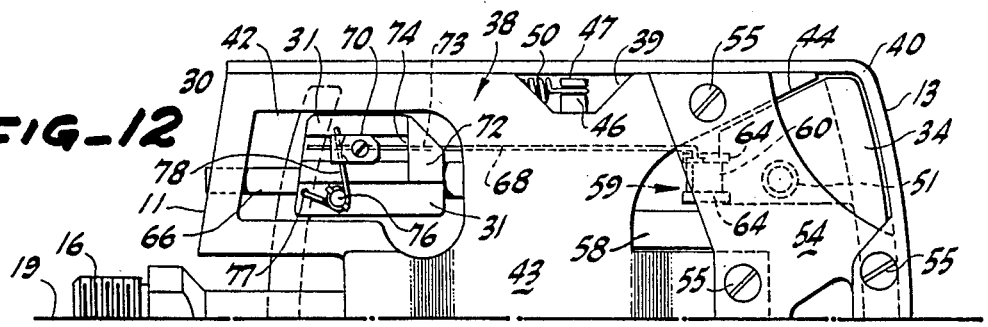

COMBINED SHOE AND PEDAL FOR SPORTS BICYCLE

BACKGROUND OF THE INVENTION

The present invention generally relates to the art of sports bicycles, and more specifically to a novel and unique strapless shoe and pedal assembly for detachably locking a bicyclist's shoes to the pedals of the bicycle.

The art has long recognized the desirability of increasing the period during which a rider can apply effective force to the pedals of a bicycle. When utilizing a conventional bicycle pedal, the rider is only able to exert a driving force during an arc of pedal movement of less than 180 degrees for each complete revolution of the crank axle; and maximum driving force is exerted only through an arc of something less than about 90 degrees.

To increase the period during which the propelling force is applied, the art has proposed various means for positively attaching the bicyclist's shoes to the pedals so as to enable the rider to develop work, or exert cranking force, on the upstroke as well as on the downstroke of each pedal cycle. Thus, while progressing through the downstroke of one pedal, the cyclist is able to apply cooperating force on the other pedal through its upstroke.

While it is highly desirable to lock, or secure, the shoes to the pedals for road and racing bicycles, such a system is equally advantageous for mountaineering bicycles used to climb steep hills and traverse rough terrain where loss of positive shoe to pedal contact, or engagement, not only reduces driving force, but also may result in serious injury to the rider.

Numerous devices have been proposed for accomplishing this desirable rigid securement. Included, for example, are strap and/or clip arrangements which are attached to the pedal and extend over the top of the shoe and sometimes the instep of the rider's shoes. Although such devices have the advantage of being useful regardless of the kind of shoe worn by the rider, they have an undesirable aspect in that they tend to dig uncomfortably into the upper portions of the rider's feet and can also disengage from the pedal under disadvantageous circumstances.

The current industry standard expedient to overcome the disadvantages of the prior art is the "Look" system, developed by Look America, Inc. of Highland Park, Ill. The system is evolved from the art of ski bindings and in general comprises a cleat fixed to the bottom of each shoe and a cleat retention mechanism integral with each pedal. The cleat retention mechanism comprises a fixed rear cleat retention plate and a spring loaded front cleat retention plate which lock onto the shoe cleat when the rider steps down onto the pedal.

Further examples of downwardly extending cleats and retaining arrangements are disclosed in U.S. Pat. No. 550,409, issued Nov. 26, 1985 to Hanson and U.S. Pat. No. 4,298,210, issued Nov. 3, 1981 to Lotteau et al. These latter systems feature bayonet locking arrangements whereby the rider steps down on the pedal and then rotates his foot through an angle to make the connection.

The Look system is satisfactory for racing and other applications in which the rider will not be expected to dismount from the bicycle and walk for any significant distance. However, walking on shoes with cleats attached is extremely uncomfortable, and the cleats will become damaged quickly if subjected to such abuse. For this reason, a retaining arrangement including sole mounted cleats is unacceptable for mountaineering bicycle applications wherein the rider must dismount from time to time and push or carry the bicycle over rough terrain.

Various arrangements which do not include sole-mounted cleats are found in the prior art. U.S. Pat. No. 575,712, issued Jan. 26, 1897 to Hamilton et al., U.S. Pat. No. 620,266, issued Feb. 28, 1899 to Wodiska and U.S. Pat. No. 616,167, issued Dec. 20, 1898 to Walker, disclose mechanical devices which are arranged to clamp over or retain the side edges of the soles of the rider's shoes. More specifically, these systems comprise clamps or lips which are moved through linkage or cam mechanisms inwardly into clamping engagement with the shoe when the rider steps downwardly onto the pedals.

Although of considerable utility, these devices are not designed for use with modern cycling shoes made of lightweight materials since they tend to dig into and rapidly damage such materials. These devices are further unacceptable for mountaineering bicycle applications as constant downward pressure on the pedals is required for the linkage mechanisms to affect lateral clamping of the shoes, and such downward pressure is essentially lacking during upward movement of the pedals while the bicycle is climbing a steep hill.

A major drawback of all retention systems known heretofore is that none of them includes a provision for disengaging the retention mechanism for conventional operation as non-retaining pedals without disassembly of the entire retention mechanism.

It is therefore an object of the present invention to provide a combined shoe and strapless pedal for a sports bicycle which securely retains the rider's shoes to the pedals without the expedient of downwardly extending cleats mounted on the soles of the shoes.

It is a further object of the present invention to provide a road pedal assembly which eliminates the discomfort associated with prior art strap and clamp retention arrangements.

It is a further object of the present invention to provide a road pedal assembly which enables the retention mechanism to be partially or entirely disengaged with minimal effort.

Other objects, together with the foregoing, are attained in the embodiments described in the following description and illustrated in the accompanying drawings.

BRIEF DESCRIPTION OF THE DRAWING

FIG. 1 is a top plan view of a combined shoe and strapless pedal for a sports bicycle embodying the present invention, the portions of the shoes above the soles being removed to clarify the disclosure;

FIG. 2 is a partial inner side elevation, viewed from the plane indicated by the line 2—2 in FIG. 1;

FIG. 3 is a partial outer side elevation, viewed from the plane indicated by the line 3—3 in FIG. 1;

FIG. 9 is a detailed top plan view of a left pedal of the present invention, the right pedal being a mirror image thereof;

FIG. 10 is a front elevation viewed from the line 10—10 in FIG. 9;

FIG. 11 is a vertical section taken on the line 11—11 in FIG. 9;

FIG. 12 is a partial bottom plan view of the present pedal assembly viewed from the line 12—12 in FIG. 10;

DESCRIPTION OF THE PREFERRED EMBODIMENTS

Figure 4:
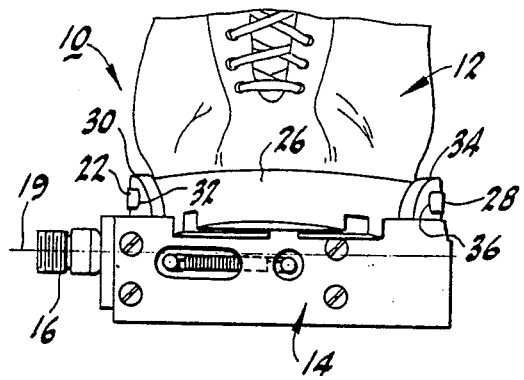
FIGS. 4 to 6 are front elevations illustrating the process of fully engaging and disengaging a left shoe from the present pedal.

While the combined shoe and strapless pedal assembly of the present invention is susceptible of numerous physical embodiments, depending upon the environment and requirements of use, substantial numbers of the herein shown and described embodiments have been made, tested and used, and all have performed in an eminently satisfactory manner.

Referring particularly to FIGS. 1 to 3 of the drawing, a combined shoe and strapless road pedal assembly for a sports bicycle embodying the present invention is generally designated by the reference numeral 10 and is designed securely but releasably to retain shoes 12 worn by a rider or operator of the bicycle (not shown) to pedal bodies 14. The pedal bodies 14 are mounted for rotation about the transverse axis 19 of pedal shafts 16, or spindles which extend from crank arms 18 of a crank shaft 20 journaled on the frame of the bicycle in a conventional manner. Each pedal body includes an inner end 11, an outer end 13, a leading edge 15 and a trailing edge 17.

The present pedal assembly 10 comprises inner retaining means in the form of protrusions which are illustrated as being a pair of pins 22 which extend laterally inwardly toward the central vertical plane 23 of the bicycle from the metatarsal, or widest transverse, region 24 of the inner side edges 25 of the soles 26 of shoes 12.

Outer retaining means or pins 28 extend laterally outwardly from the outer side edges 29 of the soles 26 in a manner identical to the pins 22 but in the opposite direction.

The pedal assembly 10 further comprises an upstanding inner retaining plate 30 formed with a spaced pair of apertures 32 (see FIG. 2). In an essentially similar manner, an upstanding outer retaining plate 34 is formed with a spaced pair of holes 36 (see FIG. 3).

In shoe-engaging position, as illustrated in FIGS. 1 to 3, the retaining plates 30 and 34 extend upwardly from the pedal bodies 14 and engage the respective lateral, or side edges 25 and 29 of the soles 26 of the shoes 12 in such a manner that the pairs of pins 22 and 28 are disposed in the pairs of holes 32 and 36 respectively, which are conjugate thereto. The shoes 12 are thereby securely locked to the pedal bodies 14.

The steps of engaging and disengaging the shoes from the pedals are readily performed.

Figure 5:
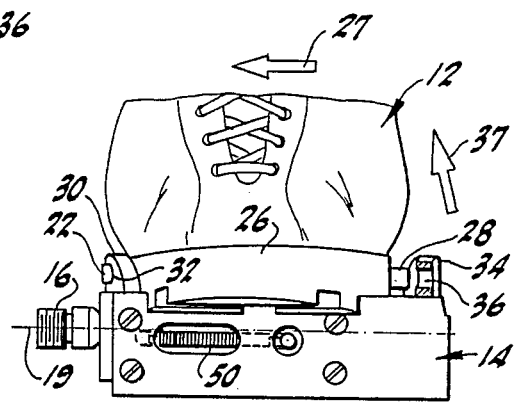
Figure 6:
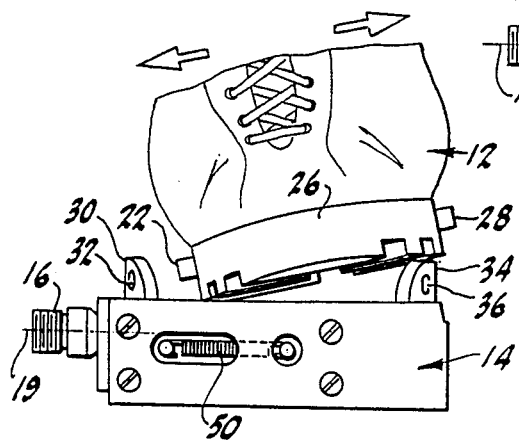

As illustrated in FIGS. 4 to 6, each inner retaining plate 30 is mounted on the respective pedal body 14 for lateral movement between fully engaged position, illustrated in FIG. 4, and a partially engaged position, illustrated in FIG. 5. In partially engaged position, the inner retaining plate 30 is spaced farther away from the outer retaining plate 34 than in the fully engaged position. The inner retaining plate 30 is spring-biased toward the fully engaged position, as will subsequently be described in detail, but may be moved to a partially engaged position against the spring force by shifting the shoe 12 laterally inwardly (toward the left in FIGS. 4 and 5).

The (left) shoe 12 is illustrated as being securely retained by the pedal assembly 10 in FIG. 4 with the conjugate pins and holes in full engagement.

To release the shoe 12 from the pedal body 14, the rider first moves the shoe 12 inwardly (leftwardly) as illustrated by directional arrow 27 in FIG. 5, thereby moving the inner retaining plate 30 against spring-bias into partially disengaged position in which the outer pins 28 are retracted and disengaged from the respective outer holes 36. The rider then rotates the (left) shoe 12 counterclockwise, as indicated by the directional arrow 37 in FIG. 5, so that the pins 28 completely clear the outer retaining plate 34. The shoe 12 can then be moved ouwardly (rightwardly) as viewed in FIG. 6 to disengage the inner pins 22 from the holes 32 in the inner retaining plate 30 and thereby entirely disengage the shoe 12 from the pedal body 14.

The procedure is reversed for engaging and retaining the shoe 12 in the pedal body 14 and will not be described in detail as such should be readily apparent from the above description.

Figure 7:
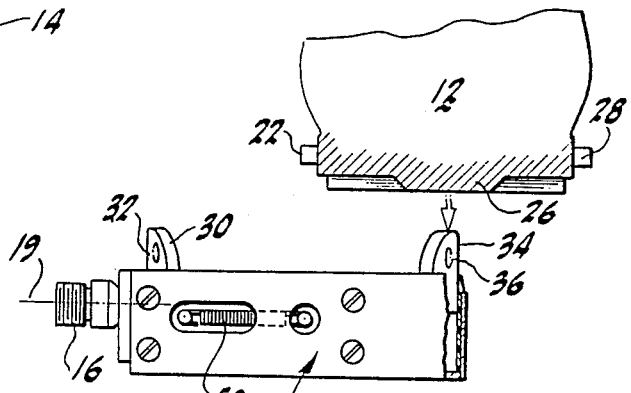
FIGS. 7 and 8 are front elevations illustrating the process of partially engaging and disengaging a left shoe from the present pedal.
Figure 8:
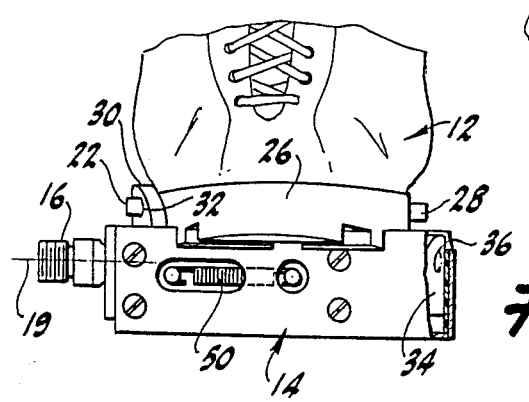

In accordance with an important feature of the present invention as illustrated in FIGS. 7 and 8, the outer retaining plate 34 is spring-biased toward an upper, pin-engaging position, as illustrated in FIG. 7, but may be moved into a lower position, illustrated in FIG. 8, in which the outer retaining plate 34 is retracted inside the pedal body 14. This is accomplished by merely depressing the top surface of the outer retaining plate 34 with the sole 26 of the shoe 12, as illustrated by the downwardly pointing arrow in FIG. 7.

The outer retaining plate 34 will be latched in the lowered, retracted position by a latch mechanism which will subsequently be described in detail, enabling the shoe 12 to be retained in a partially engaged mode, as illustrated in FIG. 8, in which only the inner pins 22 are engaged in the holes 32 in the inner retaining plate 30.

Although not shown, it is further possible to shift the shoe 12 farther outwardly from the position shown in FIG. 8 so that the pins 22 are fully disengaged from the holes 32 and the pedal assembly is operable in a conventional, non-retained mode.

As will also be described in detail, the inner retaining plate 30 is connected to the latch mechanism of the outer retaining plate 34 in such a manner that lateral movement of the inner retaining plate 30 from the partially engaged position shown in FIG. 8 toward the left will cause release of the latch mechanism and enable the outer retaining plate 34 to move upwardly from the retracted position shown in FIG. 8 to the projected position shown in FIG. 7. Upon reaching upwardly projected position, the outer retaining plate 34, is prepared to re-engage the outer pins 28 as the rider shifts the shoe 12 outwardly. The spring-bias on the inner retainer plate 30 maintains engagement with the inner pins 22.

FIGS. 9 to 15 illustrate the detailed construction of the present strapless pedal assembly. Although FIGS. 9 to 15 show the left pedal it will be noted that the right pedal is a mirror image thereof.

The pedal body 14 comprises a pedal block 38 journaled on the spindle 16 (see FIGS. 13 and 14) and an outer plate 40, or outer rim, which is fastened to the pedal block 38 by any appropriate means such as screws, bolts, welding or adhesive.

The pedal block 38 and the rim plate 40 define an inner pair of transverse channels 42 (see FIGS. 9 and 11) in which portions of the inner retaining plate 30 are slidably received for lateral, or transverse movement of the inner plate 30 between engaged and disengaged positions.

The pedal block 38 and the rim plate 40 further define a channel 44 (see FIGS. 10, 11 and 13) for slidably receiving the outer retaining plate 34 for vertical movement of the outer plate 34 between engaged and disengaged positions thereof.

The pedal block 38 includes an upper surface 35 and a lower surface 43. The upper surface 35, along with portions of the plates, receive the work effort exerted by the rider and transmit the force to the spindle 16 and crank.

As can best be seen in FIG. 9, the inner retaining plate 30 is formed with bifurcations 31 which extend outwardly. A pair of rails 66 (see FIGS. 9 and 11) fixed to the pedal block 38 transversely spans the pair of transverse channels 42 and extends through a pair of transverse holes 33 formed through the respective bifurcations 31, thereby guiding the inner retaining plate 30 for smooth lateral movement.

Figure 14:
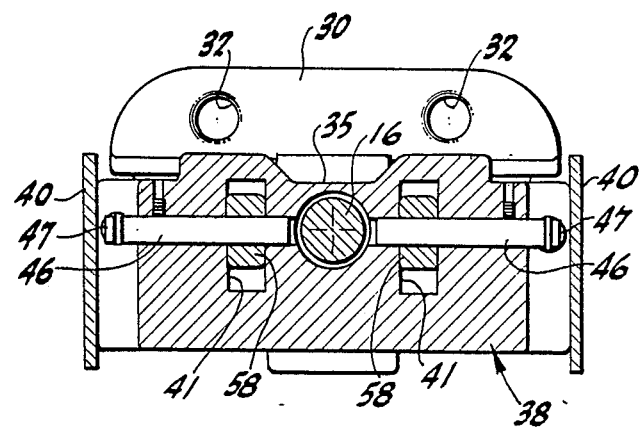
FIG. 14 is a vertical section taken along the fore and aft plane of the pedal indicated by the line 14—14 in FIG. 9; and, FIG. 15 is a vertical section taken along the arcuate line 15—15 in FIG. 9.
Figure 15:
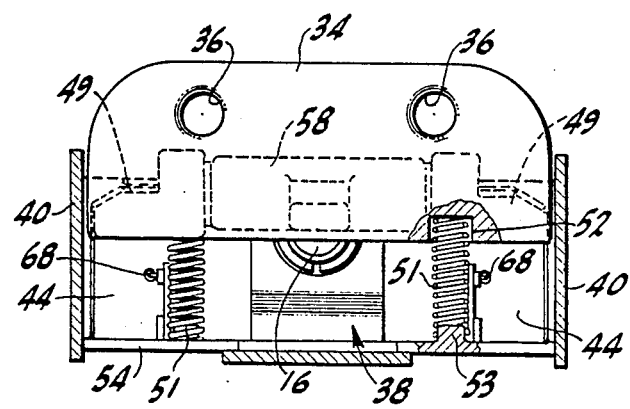

As best seen in FIGS. 9, 10 and 14, a pair of aligned fore and aft rods 46 is rigidly fitted in the block 38. The rods 46 include free ends 47 which extend into a pair of open or cutout portions 39 of the pedal block 38. Fore and aft aligned pins 48 (see FIGS. 9 and 10) are fixed to opposite ends of the inner retaining plate 30; and biasing means in the form of tension springs 50 are connected between the respective ends 47 of the rods and the pins 48 and thereby urge the inner retaining plate 30 in a right hand direction as viewed in FIGS. 9 and 10 toward an engaged position. The ends of the pins 48 protrude through transversely elongated apertures 45 in the pedal block (see FIG. 10).

Figure 13:
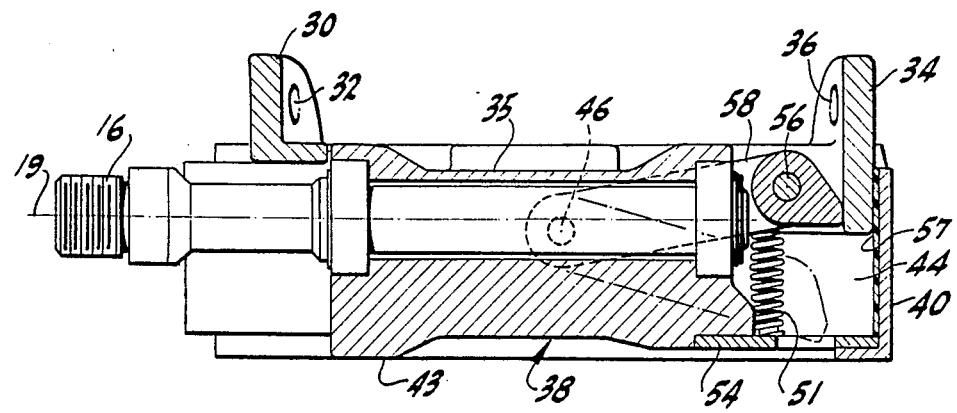
FIG. 13 is a vertical section taken along the median transverse plane of the pedal indicated by the line 13—13 in FIG. 9.

As further illustrated in FIGS. 9 and 11, the pedal block 38 is formed with a pair of central open or cutout portions 41 through which the central portion of each of the rods 46 extends. Biasing means in the form of compression springs 51 are retained between a pair of blind holes 52 (see FIG. 15) formed in the lower surfaces of two spaced arms 49 projecting inwardly from the outer retaining plate 34 and a pair of spring seats 53 extending upwardly from an adjacent upper surface of a bottom plate 54 mounted by screws 55 to the bottom 43 of the pedal block 38. The springs 51 urge the outer plate 34 upwardly toward the engaged position as illustrated in FIGS. 11 and 13.

A fore and aft rod 56 rigidly extends through the two transverse arms 49 of the outer retaining plate 34 and a bifurcated link 58, or yoke, is pivotally connected at its opposite ends to the adjacent ends of the two rods 46 and to the central portion of the rod 56, thereby guiding the outer retaining plate 34 for substantially vertical pivoted movement. The channel 44 is provided with sufficient clearance to accommodate the small amount of lateral movement introduced by rotation of the link 58. As an alternative as appears most clearly in FIGS. 11 and 13, an arcuate strip 57 of anti-friction material can be used in which case the pivoted connections of the link 58 are made loose enough to accommodate the right lateral movement caused by rotation of the link.

As best seen in FIGS. 11 and 12, latch means 59 for releasably latching the outer retaining plate 34 in the lower, or disengaged, position comprises a pair of latch arms 60 on vertical mounting plates 64, mounted on the bottom plate 54, by respective pivotally supported pivot pins 61. A pair of latch pins 62 is integrally fixed to the inner ends of the arms 49 on the outer retaining plate 34. The latch arms 60 are normally urged clockwise as viewed in FIG. 11 by biasing means, which will be described in detail hereinbelow, toward the outer retaining plate 34 and thus into latching engagement with the latch pins 62.

More specifically, downward movement of the outer retaining plate 34 causes the lower sloping portions of the latch pins 62 to cam aside the conjugate upper sloping surfaces of the catch portions 63 of the latch arms 60 until clear, at which juncture the latch arms 60 return to upright attitude with the latch portions 63 overlying the latch pins 62. In this manner, subsequent upward movement of the outer retaining plate 34 is prevented by engagement of the latch pins 62 with the overlying catch portions 63.

The present assembly 10 further comprises means for releasing the latch mechanism 59 including a pair of rigid transversely oriented connecting rods 68 which may be formed from a piece of stiff wire. Leftward movement of the connecting rods 68, as viewed in FIG. 11, causes counterclockwise rotation of the latch arms 60, thereby releasing the latch pins 62 and allowing the outer retaining plate 34 to move upwardly to upper engaged position under urgency of the compressive springs 51.

The release means further comprises a pair of first engaging members 70 rigidly fixed to the ends of the connecting rods 68 adjacent the inner retaining plate 30. A pair of second engaging members 72 is integrally formed as a portion of the inner retaining plate 30. The second engaging members 72 are each formed with a transverse aperture 73, or hole, through which the connecting rod 68 slidably extends and an engaging surface 74 which is abuttable with the adjacent first engaging member 70 when the inner retaining plate 30 is translated inwardly (toward the left in FIG. 11).

A small post 76 is fixed to the bifurcation arm 31 of the plate 30, as best seen in FIG. 12. A wire torsion spring 78 is coiled around the post 76. One end of the spring wire is anchored in a hole 77 formed in the bifurcation arm 31 of the inner retaining plate 30. The other end of the torsion spring 78 engages the left side of the first engaging member 70, as viewed in FIGS. 11 and 12. The spring 78 exerts a rightward force on the first engaging member 70 and thereby the connecting rod 68 which provides the biasing force heretofore described, urging the latch arm 60 rightwardly and clockwise toward latching engagement with the latch pin 62.

Initial leftward movement of the inner retaining plate 30, as viewed in FIGS. 11 and 12, has no effect on the latch mechanism because the engaging members 70 and 72 remain disengaged. In other words, it is necessary for the inner retaining plate 30 to move to the left through a predetermined distance, equal to the initial spacing between the first engaging member 70 and the engaging surface 74 when the inner retaining plate 30 is in engaged (rightmost) position, before abutment of the engaging surface 74 with the first engaging member 70 can occur. However, further leftward movement of the inner retaining plate 30 and accompanying second engaging member 72 toward disengaged position causes the first engaging member 70 and thereby the connecting rod 68 and latch arm 60 to move leftwardly for release of the latch pin 62 and consequent upward movement of the outer retaining plate 34 to fully elevated position.

Although a specific and preferred embodiment of the present invention has been described in detail, the invention is not so limited. Various modifications, such as eliminating the bifurcated link 58 and allowing the outer retaining plate 34 to be guided for upward and downward movement by the channel 44 alone will become readily apparent to those of skill in the art. A further modification would be to replace the latch release mechanism disclosed herein with a spring connected directly to the latch arm 60; and to replace the connecting rod 68 and engaging members 70 and 72 with a flexible wire or cord. In such a case, the spacing between the engaging members 70 and 72 in the illustrated embodiment could be duplicated by means of a predetermined amount of slack in the wire or cord. As yet a further modification, the retaining means which have been described as conjugate pins and holes formed on the sides of the sole of the shoe and in the vertical retaining plates respectively may be replaced with any other configuration which will provide an equivalent function, such as elongated ridges formed in the sides of the sole and elongated claws or clamps conjugate to the ridges for retaining engagement therein.

Various other modifications will become possible for those skilled in the art after receiving the teachings of the present disclosure without departing from the teachings thereof.

What is claimed is:

1. A bicycle road pedal assembly in combination with a shoe having a sole with inner and outer retaining members affixed to inner and outer side edges, respectively, of the sole of the shoe, comprising:
   a. a pedal body;
   b. inner and outer retaining plates movably attached to said pedal body and having inner and outer retaining means for releasable securing engagement with the respective inner and outer retaining members of the sole;
   c. said outer retaining plate being vertically movable between an upper engaged position at which the outer retaining member of the sole and said outer retaining plate are engageable with each other, and a lower disengaged position at which said outer retaining plate is retracted into said pedal body;
   d. first biasing means for urging said outer retaining plate toward said upper engaged position;
   e. said inner retaining plate being laterally movable between an engaged position at which the inner and outer retaining members of the sole and said inner and outer retaining plates are engaged with each other respectively, and a disengaged position at which the outer retaining member of the sole and said outer retaining plate are disengaged from each other while the inner retaining member of the sole and said inner retaining plate are engaged with each other, said inner and outer retaining plates being spaced farther from each other in said disengaged position than in said engaged position;
   f. second biasing means for urging said inner retaining plate toward said engaged position;
   g. latch means for releasably latching said outer retaining plate in said lower disengaged position; and,
   h. release means connected to said inner retaining plate for releasing said latch means to enable said outer retaining plate to be moved by said first biasing means from said lower disengaged position to said upper engaged position when said inner retaining plate is in said disengaged position.

2. A road pedal assembly as in claim 1, in which the outer retaining member of the sole is a protrusion, and said outer retaining means of said outer retaining plate is an aperture conjugate with said protrusion.

3. A road pedal assembly as in claim 1, in which the outer retaining member of the sole is a laterally extending pin, and said outer retaining means of said outer retaining plate is a hole conjugate with said pin.

4. A road pedal assembly as in claim 3 in which said outer retaining means are disposed at a metatarsal area of the sole.

5. A road pedal assembly as in claim 1, in which the inner retaining member of the sole is a protrusion, and said inner retaining means of said inner retaining plate is an aperture conjugate with said protrusion.

6. A road pedal assembly as in claim 1, in which the inner retaining member of the sole is a laterally extending pin, and said inner retaining means of said inner retaining plate is a hole conjugate with said pin.

7. A road pedal assembly as in claim 6, in which said inner retaining means are disposed at a metatarsal area of the sole.

8. A road pedal assembly as in claim 1, in which said first and second biasing means comprise first and second springs, respectively.

9. A road pedal assembly as in claim 1, in which said latch means comprises a latch arm pivotally connected to said pedal body and a latch pin fixed to said outer retaining plate, and third biasing means urging said latch arm toward said outer retaining plate.

10. A road pedal assembly as in claim 9, in which said third biasing means comprises a spring.

11. A road pedal assembly as in claim 10, in which said release means comprises a connecting member fixed at one end to said latch arm and extending toward said inner retaining plate, a first engaging member fixed to an opposite end of said connecting member and a second engaging member integral with said inner retaining plate, one of said springs being connected between said inner retaining plate and said first engaging member, said first and second engaging member being located such that the second engaging member engages the first engaging member thereby moving the connecting member and latch arm away from said outer retaining plate when said inner retaining plate is moved from engaged position toward disengaged position by a predetermined distance.

12. A road pedal assembly as in claim 11, in which said connecting member comprises a rod.

13. A road pedal assembly as in claim 12, in which said second engaging member is formed with a hole therethrough, said rod slidably extending through said hole.

14. A combined shoe and pedal for a sports bicycle comprising:
   a. a pedal body having an inner end, an outer end, a leading edge and a trailing edge;

b. means for mounting said pedal body on a pedal shaft of a sports bicycle for rotation about the axis of the pedal shaft, said pedal body being oriented so that said inner end is adjacent a crank arm of the bicycle and said leading edge faces forwardly;
c. inner retaining means on said pedal body for releasably engaging the inner side edges of a rider's shoe sole;
d. outer retaining means on said pedal body for releasably engaging the outer side edges of the rider's shoe sole; and,
e. means on said pedal body for temporarily enlarging the distance between said inner retaining means and said outer retaining means to enable the rider selectively to disengage and engage the shoe sole with said inner and outer retaining means wherein said distance enlarging means includes means for biasing said inner retaining means toward said outer retaining means and wherein said outer retaining means is vertically movable into a lowered retracted position out of engagement with the outer side edges of the rider's shoe sole; and including latching means for maintaining said outer retaining means in said lowered retracted position.

15. A device as in claim 14 including means for interconnecting said biasing means and said latching means for disabling said latching means as lateral force is exerted by the rider's shoe in opposition to said biasing means, and said inner retaining means is moved a predetermined distance away from said outer retaining means.

* * * * *